(12) United States Patent
Tretjakov et al.

(10) Patent No.: US 8,527,503 B2
(45) Date of Patent: *Sep. 3, 2013

(54) PROCESSING SEARCH QUERIES IN A NETWORK OF INTERCONNECTED NODES

(75) Inventors: Konstantin Tretjakov, Tallinn (EE); Luciano Garcia-Bañuelos, Tartu (EE); Abel Armas-Cervantes, Tartu (EE); Jaak Vilo, Tartu (EE); Marlon G. Dumas, Tartu (EE)

(73) Assignee: Skype, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/341,373

(22) Filed: Dec. 30, 2011

(65) Prior Publication Data

US 2013/0103671 A1    Apr. 25, 2013

(30) Foreign Application Priority Data

Oct. 24, 2011   (GB) .................................... 1118332.4

(51) Int. Cl.
*G06F 7/00* (2006.01)

(52) U.S. Cl.
USPC ....................................................... 707/716

(58) Field of Classification Search
USPC .......... 707/716, 705; 370/217, 238; 701/201
See application file for complete search history.

(56) References Cited

U.S. PATENT DOCUMENTS

| 7,177,295 | B1 | 2/2007 | Sholander et al. | |
|---|---|---|---|---|
| 7,584,298 | B2 | 9/2009 | Klinker | |
| 7,787,361 | B2 * | 8/2010 | Rahman et al. | 370/217 |
| 2009/0040931 | A1 * | 2/2009 | Bast et al. | 370/238 |
| 2009/0228198 | A1 * | 9/2009 | Goldberg et al. | 701/201 |
| 2012/0254153 | A1 * | 10/2012 | Abraham et al. | 707/716 |
| 2013/0103678 | A1 | 4/2013 | Tretjakov | |

OTHER PUBLICATIONS

"Notice of Allowance", U.S. Appl. No. 13/341,488, (May 2, 2013), 16 pages.
"Restriction Requirement", U.S. Appl. No. 13/341,488, (Mar. 5, 2013), 7 pages.

* cited by examiner

*Primary Examiner* — Hung T Vy
(74) *Attorney, Agent, or Firm* — Wolfe-SBMC

(57) ABSTRACT

A search query to provide a search result may be received, which identifies source and target nodes and an application for generating the search result. The application accesses a data structure holding landmark nodes, which store a shortest path tree in the form of a set of parent links. Each parent link can identify an adjacent vertex node in a shortest path between each node in the data structure and the landmark node. The location of the source node and the target node in the shortest path trees may be identified to the landmark node. For each landmark node, using the identified locations of the target node and source node, a measure of distance between the source node and the target may be generated. The landmark node with the shortest distance may be determined. A search result related to the shortest path tree of that landmark node may be provided.

33 Claims, 6 Drawing Sheets

| u | $P_u[V_1] = u$ | ← 22 |
|---|---|---|
|   | $P_u[V_2] = u$ |   |
|   | $P_u[V_3] = V_1$ |   |
|   | $P_u[V_4] = V_1$ |   |
|   | $P_u[V_5] = V_3$ |   |
|   | $P_u[V_6] = V_3$ |   |
|   | $P_u[V_7] = V_4$ |   |
|   | $P_u[V_8] = V_6$ |   |

FIG. 4

PROCESSING SEARCH QUERIES IN A NETWORK OF INTERCONNECTED NODES

RELATED APPLICATION

This application claims priority under 35 U.S.C. §119 or 365 to Great Britain Application No. GB 1118332.4, filed Oct. 24, 2011. The entire teachings of the above application are incorporated herein by reference.

TECHNICAL FIELD

The present invention relates to processing search queries, in particular in a network of interconnected nodes.

BACKGROUND

There exist many situations where computer networks comprise a typically very large number of interconnected nodes. For example, the communication network of Skype represents a large social network for peer to peer communication. FIG. 1 is a schematic diagram of a small part of a typical computer network. The network is shown to comprise a plurality of nodes Ni. Each node can be associated with one or more physical computer devices as shown for example in the case of node Ni which is shown to be associated with a mobile device 2, a PC 4 and a tablet 6. Each node is associated with a single user, who in this case can register or log in with a particular network using any one of the computer devices. The nodes are shown interconnected by connections Ci. In the context of the physical network, the connections Ci can be implemented in any known way, wired or wireless. In the context of users associated with nodes, the connections do not necessarily pertain to a single physical connection in a network, but represent a relationship between users associated with the nodes at either end of the connection. As an example, in the case of Skype, two users are considered to be connected if they are in each other's contact lists. A common challenge with such networks is to allow a user to search for another user by name for example and to see the results of a search ranked in the order of their shortest path distance to him. Similarly, a user may wish to know what chain of contacts allows him to reach another user in the network. Attempts to solve the problem have used analytic techniques for finding the shortest paths between a given pair of nodes in a graph.

There exists a large body of methods to address this problem. Existing methods can be broadly classified into exact and approximate. Exact methods, such as those based on Dijkstra's traversal, are prohibitively slow for performing online queries on graphs with hundreds of millions of vertices, which is a typical size for a contemporary social network. Among the approximate methods, a family of scalable algorithms for this problem are the so-called landmark-based (or sketch-based) approaches. In this family of techniques, a fixed set of landmark nodes is selected and distances are precomputed from each vertex to some or all of the landmarks. Knowledge of the distances to the landmarks, together with the triangle inequality, typically allows one to compute approximate distance between any two vertices in $O(k)$ time, where k is the number of landmarks, and $O(kn)$ space, where n is the number of vertices in the network. Those estimates can then be used as-is, or exploited further as a component of a graph traversal or routing strategy in order to obtain an exact shortest path.

Reference is made to a paper by Potamias et al entitled "Fast Shortest Path Distance Estimation in Large networks" in CIKM '09: Proceedings of the $18^{th}$ ... Conference on IKM, pages 867-878 NY, USA 2009. In that paper, a landmark based distance estimation algorithm is evaluated under different landmark selection strategies. The algorithm relies on the storage of the distance of each landmark node to each other vertex in the graph. As with other landmark-based algorithms, approximation quality can be poor, particularly as networks scale up over time.

In another paper by Gubichev, et al entitled "Fast and accurate estimates of shortest paths in large graphs. In CKM'10: Proceeding of the $19^{th}$ AEM Conference in IKM pages 499-508, AEM 2010." Complete paths are stored from each vertex to each landmark, with different sets of landmarks for each vertex. This significantly increases memory requirements and increases execution times for processing queries.

Although landmark-based algorithms do not provide strong theoretical guarantees on approximation quality, they have been shown to perform well in practice, scaling up to graphs with millions or even billions of edges with acceptable accuracy and response times of under one second per query.

It is an objective of the present invention to improve the accuracy over existing techniques, with acceptable computation times and memory requirements for returning results of a search query.

SUMMARY

According to an aspect of the present invention there is provided a computer implemented method of processing a search query to provide a search result, the method comprising receiving at a computer device a search query in the form of a digital message, the query identifying a source node and a target node and executing at the computer device an application for generating a search result, the application performing the following steps: accessing a data structure holding a plurality of landmark nodes, each landmark node having stored therewith a shortest path tree in the form of a set of parent links wherein each parent link identifies an adjacent vertex node in a shortest path between each node in the data structure and the landmark node; for each landmark node, identifying the location of the source node and the target node in the shortest path trees to the landmark node; for each landmark node using the identified locations of the target node and source node to generate a measure of distance between the source node and the target node; determining the landmark node with the shortest distance; and providing a search result related to the shortest path tree of that landmark node.

The invention also provides a computer program product comprising a non-transitory computer readable medium storing thereon computer readable instructions which when executed by a computer perform the steps of the method defined above.

The invention provides in different embodiments three techniques.

According to a first technique the measure of distance is generated by computing a first distance over the shortest path between the source node and the landmark node; computing a second distance over the shortest path between the landmark node and the target node; and summing the first and second distances.

According to a second technique, the measure of distance is generated by identifying a common ancestor node in the shortest path trees from the source node and the target node to the landmark node; in one version, this is followed by the step of summing a first distance from the source node to the common ancestor node and a second distance from the common ancestor node to the target node.

In another version, this is followed by the steps of identifying all pairs of nodes in a first path between the source node and the common ancestor node and a second path between the common ancestor node and the target node; locating any of said pairs which are edges; identifying the edge of the shortest distance; and using the edge to determine the measure of distance between the source node and the target node.

According to a third technique the measure of distance is generated by recording nodes in common between the shortest path trees from the source node and the target node to each landmark node; executing a graph traversal from the square node, traversing only commonly recorded nodes, to update a shortest path tree from the source node to the target node; and using the updated shortest path to determine the measure of distance.

The invention provides in another aspect a computer device for processing a search query to provide a search result, the computer device comprising: a first component in the form of a data structure holding a plurality of landmark nodes, each landmark node having stored therewith a shortest path tree in the form of a set of parent links wherein each parent link identifies an adjacent vertex node in the shortest path between each node in the data structure and the landmark node: and a second component comprising a processor configured to execute an application for generating a search result, the application performing the following steps: accessing the data structure; for each landmark identifying the location of the source node and the target node in shortest path trees to the landmark node; for each landmark using the identified locations of the target node and source node to generate a measure of distance between the source node and the target node; determining the landmark with the shortest distance; and providing a search result related to the shortest path tree of that landmark.

Embodiments of the invention described in the following provide improvements relating to the use of shortest path trees, in particular where the shortest path tree is held in the form of parent links, where each parent link is the next vertex on a shortest path from a source vertex to a landmark. The use of shortest path trees allows to achieve higher accuracy with acceptable time and memory overhead. Furthermore, shortest path trees stored in this way can be maintained incrementally under edge insertions and deletions, which allows for a fully dynamic algorithm. Thus, the use of shortest path trees provide a significant improvement with respect to the paper referenced above in the name of Potamias which just keeps the distance from each landmark to every vertex.

In contrast to the paper by Gubichev, paths are stored in the form of one shortest-path-tree per landmark. The storage of shortest path trees is in a form which stores only a single pointer (parent link) per vertex-landmark pair (as opposed to different sets of landmarks for each vertex), reduces memory requirements and allows for the possibility of performing incremental updates. Embodiments of the invention discussed in the following allow for a significantly improved execution time, for example more than four seconds on a graph with ten times less edges and one hundred times less vertexes than a Skype graph snapshot of February 2010.

For a better understanding of the present invention and to show how the same may be carried into effect reference will now be made by way of example to the accompanying drawings:

BRIEF DESCRIPTION OF THE DRAWINGS

FIG. 4 illustrates a data set for one landmark.

DESCRIPTION OF THE PREFERRED EMBODIMENT

Figure 1:
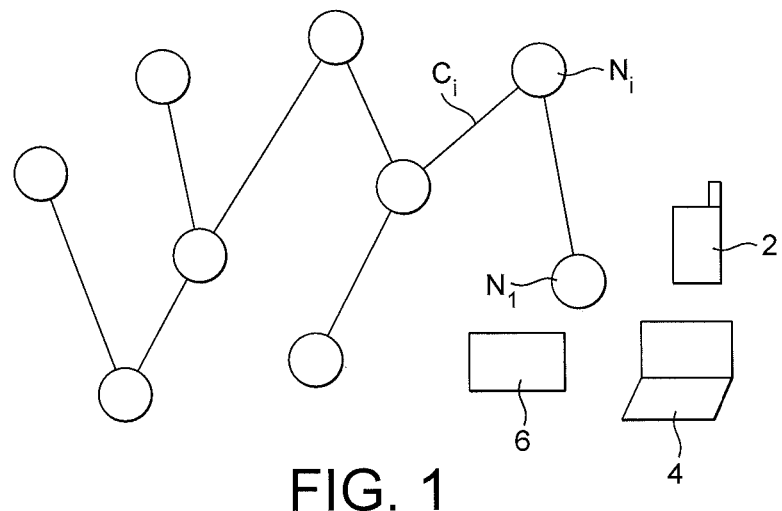
FIG. 1 is a diagram of part of a network.
Figure 2:
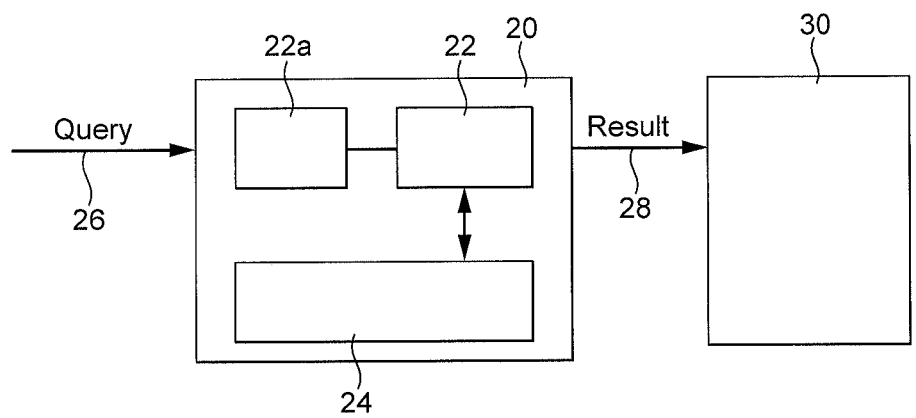
FIG. 2 is a block diagram of a system for performing a search query.

FIG. 2 is a schematic block diagram of a system for processing a search query. The system comprises a computer device 20 which implements two components. A first component 22 is a data structure which is a memory or other form of computer store holding data in the form of a graph as described further herein. The second component is a processing function 24 which accesses the data structure 22 and uses it to process a search query. In operation, a query 26 in the form of a digital message is received by the computer device 20 and the computer device 20 operates to generate a result 28. The result can be utilised in a number of different ways by a user result function 30. For example the user result function 30 can be a search function which receives other inputs along with the result 28 and generates a search result to a user. Alternatively, the user result function 30 can be a display which displays a result 28 directly to a user.

Each component 22, 24 can be implemented by a processor and a memory. It will readily be appreciated that a single processor and single memory can be used to provide both components, or the components can be provided by separate processes and separate memories. In the first component, code executed by the processor 22a maintains the data structure, and in the second component code executed by the processor processes the search query as will be described more fully later.

The query 26 is received by the computer device 20 from a user. A user can input the query into one of the physical devices with which he is associated by any known input means. The query is supplied to the computer device 20 in the form of a digital message over any transmission mechanism. For example, where the user is associated with a client terminal, the query can be supplied through the internet to a server at which the computer device 20 is implemented. Alternatively, the query could be handled locally at a client terminal. As will become clearer in the following, the query includes an identifier of a source node, generally being a node associated with the user inputting the query, and a target node which will be the subject of the search.

An improvement over existing techniques derives from the use of shortest path trees (SPTs) to maintain the paths between each landmark and every vertex in the graph. Based on this data structure, three strategies are derived for computing an approximate shortest path between any pair of nodes. Moreover, the use of SPTs makes the proposed method suitable for continuously evolving graphs.

Embodiments of the invention will now be described.
Basic Definitions
Let $G=(V,E)$ denote a graph with $n=|V|$ vertices and $m=|E|$ edges. For simplicity of exposition, we shall consider an undirected, unweighted graph, although the approach can be easily generalized to accommodate weighted directed graphs as well.

A path $\pi_{s,t}$ of length l between two vertices $s, t \epsilon V$ is defined as a sequence $\pi_{s,t} = (s, u_1, u_2, \ldots, u_{l-1}, t)$, where $\{u_1, u_2, \ldots,$ $u_{l-1}\} \subset V$ and $\{(s,u_1), (u_1,u_2), \ldots, (u_{l-1},t)\} \subset E$. We denote the length of a path $\pi_{s,t}$ as $|\pi_{s,t}|$. The concatenation of two paths $\pi_{s,t}=(s, \ldots, t)$ and $\pi_{t,v}=(t, \ldots, v)$ is the combined path $\pi_{s,v}=\pi_{s,t}+\pi_{t,v}=(s, \ldots, t, \ldots, v)$ The upper bound becomes an equality if there exists a shortest path $p_{s,t}$ which passes through u.

The diameter of a graph is the maximal length of a shortest path in the graph. An important property of social networks in this respect is that their diameter is small. Centrality of a vertex is a general term used to refer to a number of metrics of importance of a vertex within a graph. Betweenness centrality corresponds to the mean proportion of shortest paths passing through a given vertex. Closeness centrality measures the average distance of a vertex to all other vertices in the graph.

Landmark-Based Distance Estimation

Before describing improvements, the basic landmark-based distance estimation technique will be explained.

As noted in Equation 1, if we fix a single landmark node u and precompute the distance d(u,v) from this node to each other vertex v in the graph, we can get an upper bound approximation for the distance d(s,t) between any two vertices s and t:

$$d^u_{approx.}(s,t) = d(s,u) + d(u,t)$$

If we now select a set $U=\{u_1, u_2, \ldots, u_k\}$ of k landmarks, a potentially better approximation can be computed:

$$d^U_{approx.}(s,t) = \min_{u \in U} d^u_{approx.}(s,t)$$

In principle, the triangle inequality also allows to compute a lower bound on the distance, but previous work indicates that lower-bound estimates are not as accurate as the upper-bound ones.

In the following we refer to this algorithm as LANDMARKS-BASIC (Algorithm 1)

For unweighted graph, the algorithm requires O(km) time to precompute distances using k BFS traversals and O(kn) space to store the distances. Each query is answered in O(k) time. Note that this approach only allows us to compute an approximate distance, but does not provide a way to retrieve the path itself.

Improved Landmark-Based Algorithms

Shortest Path Trees

The concept underlying embodiments of the invention is the idea of maintaining an explicit shortest path tree (SPT) for each landmark, instead of simply storing the distances to landmarks as numbers. More precisely, let $p_u[v]$ be the next vertex on an arbitrarily chosen shortest path from a vertex v to a landmark u. We shall refer to $p_u[v]$ as the parent link of v in the SPT of u (see FIG. 3). Similarly to distances, parent links can be computed in a straightforward manner during a BFS traversal of the graph in O(m) time per landmark.

Figure 3:
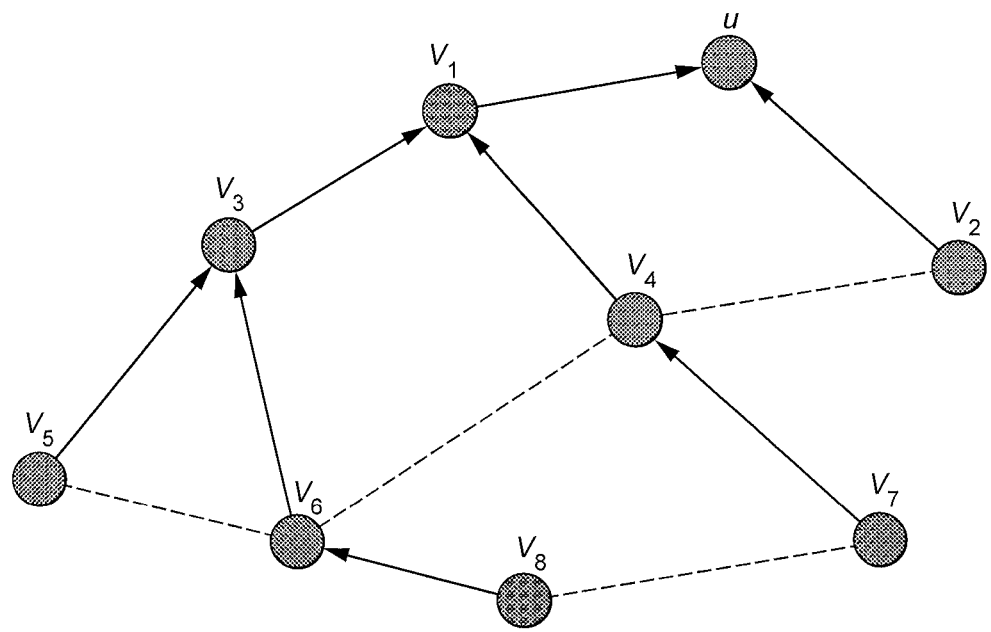
FIG. 3 illustrates a shortest path tree for one landmark.

In FIG. 3 black arrows denote parent links. Dashed lines are graph edges that are not part of the tree.

The availability of parent links enables us to recover an exact shortest path from each vertex v to each landmark u by simply following the corresponding links. For example, if the source node is $V_5$, the data set indicates $pu[V_5]=V3$; $pu[V_3]=V1$; $pu[V_2]=u$. Consequently, it also allows to compute the shortest path distance d(u,v) (in that case 3) and thus directly apply the ideas of the LANDMARKS-BASIC algorithm, with the only difference that each distance computation now requires O(D) steps, where D is the diameter of the graph. As the diameters of social network graphs tend to be small, the overhead of such a computation is minor.

Note that this approach allows to retrieve an actual path between any two vertices in addition to the distance approximation. FIG. 4 shows the data set for landmark u in the data structure 22. It will be appreciated that a similar data set is held for each landmark.

Lowest Common Ancestor Method

Besides performing basic landmark-based approximation, the availability of the SPT allows us to significantly improve the upper bound estimates on distances for many vertex pairs. Consider the situation depicted in FIG. 5 and suppose we wish to approximate the distance between $v_5$ and $v_8$. By applying the basic technique we obtain an upper bound estimate of $d(v_5,v_8) \leq d(v_5,u)+d(u,v_8)=3+4=7$. Observe, however, that once we have the explicit shortest paths:

$$\pi_{v_5,u}=(v_5,v_3,v_1,u), \pi_{v_8,u}=(v_8,v_6,v_3,v_1,u),$$

we can note that both of them pass through $v_3$ and thus the estimate $$d(v_5,v_8) \leq d(v_5,v_3)+d(v_3,v_8)=1+2=3.$$

will result in a better upper bound. In general, whenever two shortest paths $\pi_{s,u}$ and $\pi_{t,u}$ have a common vertex $v \neq u$, we have $$d(s,t) \leq d(s,v)+d(v,t) < d(s,u)+d(u,t), \quad (2)$$

and thus if we use v instead of u to approximate d(s,t) we obtain a tighter bound. Naturally, it makes sense to select the vertex v providing the best such approximation. It can be seen that this vertex is the lowest common ancestor (LCA) of s and t in the SPT of u. When approximating distance between $v_5$ and $v_8$ we use their lowest common ancestor $v_3$ instead of the landmark u as a reference.

This observation provides the basis of an LCA approximation method (DISTANCE-LCA, Algorithm 2). By substituting this distance estimate into Equation 3, we obtain a new algorithm LANDMARKS-LCA with increased accuracy. Note that this algorithm can also be trivially extended to return the actual path.

Figure 5:
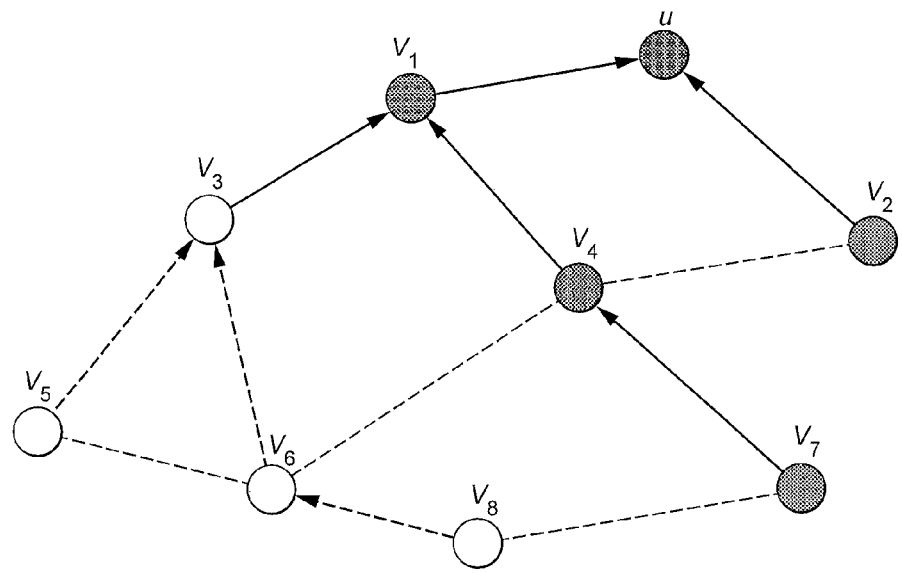
FIG. 5 illustrates a shortest path tree with a lower common ancestor.

One way to understand the extent of improvement is to note that the basic algorithm will provide exact estimates only for shortest paths that pass through the landmark vertex. In FIG. 5 those are only the paths connecting $v_2$ with $v_1$ and $v_3$. The LCA algorithm, however, will provide exact answers for all shortest paths that lie along the SPT, and there will be typically considerably more of those.

Landmarks-BFS

The algorithms LANDMARKS-BASIC and LANDMARKS-LCA use each landmark for distance approximation independently of the other landmarks. This is not the best possible use of all available landmark data. Consider FIG. 6, for example. When approximating distance between vertices $v_1$ and $v_5$, we would obtain a path of length 5 if we used the two landmarks independently. By combining the two subtrees we can find a better path of length 4.

This suggests a powerful improvement over the previous approaches. In order to approximate distance between two vertices, collect all paths from those vertices to all landmarks, and perform a usual BFS (or, in the case of weighted graphs, Dijkstra) traversal on the subgraph, induced by the union of those paths. We refer to this algorithm as LANDMARKS-BFS (Algorithm 3).

For k landmarks, the size of the subgraph will be less than 2 kD. Consequently, the memory complexity of LANDMARKS-BFS is O(kD) and the time complexity is at most $O(k^2D^2)$.

By taking other graph edges (i.e., "shortcuts") into account, in LANDMARKS-BFS we further improve the distance approximation to 3.

Shortcutting

Denote the lowest common ancestor of s and t by v. The LCA algorithm approximates $\pi_{s,t}$ by a concatenation of $\pi_{s,v}$ with $\pi_{v,t}$. However, it may happen that a vertex w∈$\pi_{s,v}$ is connected directly by an edge with a vertex w'∈$\pi_{v,t}$. In this case, an even shorter approximation to $\pi_{s,t}$ can be obtained by concatenating the paths $\pi_{s,w}$, $\pi_{w,w'}$, and $\pi_{w',t}$. For example, in FIG. 5, the edge ($v_5, v_6$) acts as a shortcut from $\pi_{v_5,v_3}$ to $\pi_{v_3,v_8}$. If we account for this edge, we may further improve the LCA distance estimate to the true shortest path $d(v_5,v_8)=2$.

In order to locate shortcuts we can simply examine all pairs of vertices in $\pi_{s,v} \times \pi_{t,v}$, and if some of them are connected by an edge, find the edge providing the best distance estimate. This can be done in $|\pi_{s,v}| \times |\pi_{t,v}|$, i.e., at most $O(D^2)$ steps. We refer to the resulting distance approximation method as DISTANCE-SC (Algorithm 4. By using this upper bound estimate in Equation 3 we obtain the landmark-based algorithm LANDMARKS-SC.

Landmark Selection Techniques

Although landmarks can be selected uniformly at random, it has been shown by experiment that selecting landmarks with the highest degree or lowest closeness centrality typically ensures better distance estimates, whereas it is shown that the two methods provide similar accuracy. The above estimation algorithms can be used with any landmark selection technique, but a novel landmark selection technique with improved accuracy is now described.

Best Coverage

Figure 7:
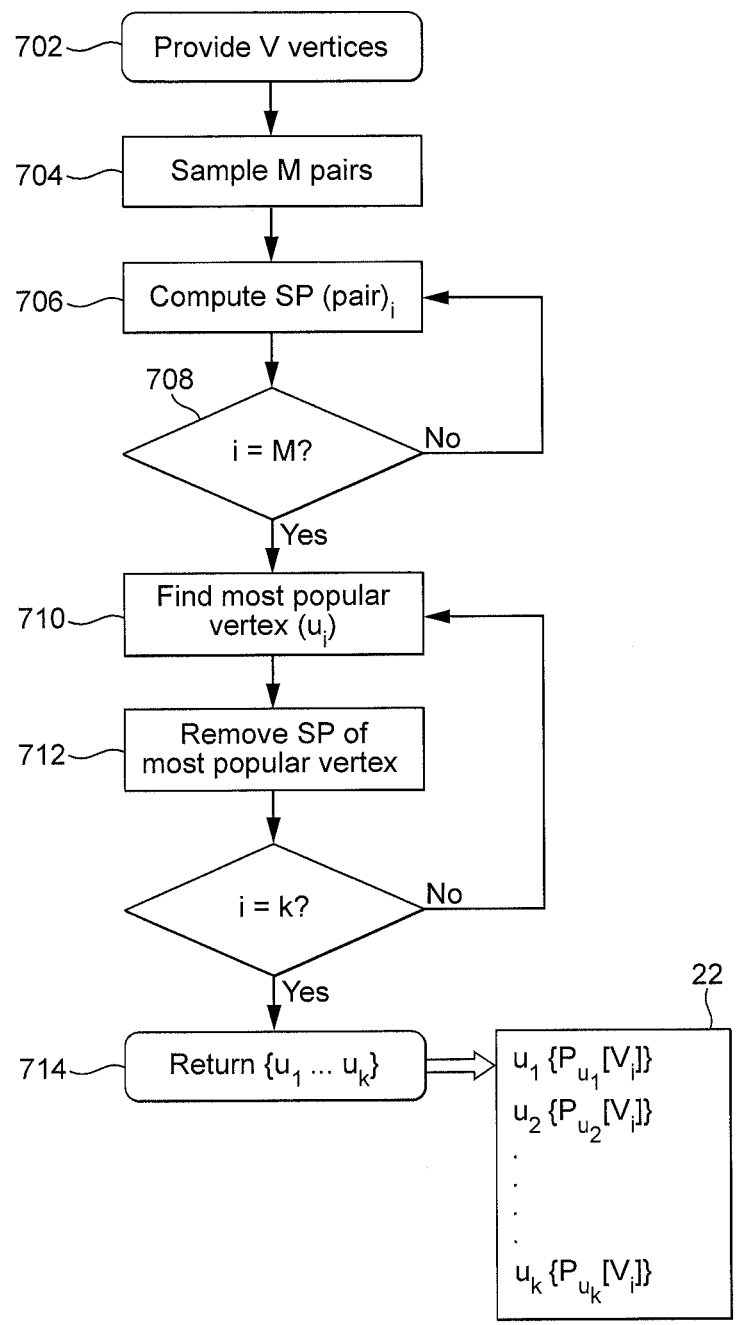
FIG. 7 is a flow chart of a landmark selection method.

When a landmark u lies on the shortest path between s and t, its upper bound distance estimate is exact. We say that such a landmark covers the pair (s,t). Consequently, the most desirable set of landmarks would be the one that covers as many vertex pairs as possible. A simple greedy strategy based on sampling is explained with reference to Algorithm 4, and FIG. 7. A graph G with V vertices representing the network is supplied (702). We sample (704) a set of M vertex pairs, and compute (706, 708) exact shortest path for each pair. This computation can be carried out by any known method, e.g. BSF graph traversal. As the first landmark we select (710) the vertex that is present in the greatest number of paths of the sample, i.e. the most popular vertex. We remove (712) the paths covered by that first landmark from the sample and proceed to select (by returning to 710 for i<k) the second landmark as the vertex, which covers most of the remaining paths. Subsequent landmarks in the returned (714) set $\{u_1-u_h\}$ are determined in a similar way. The landmarks are stored in the data structure 22.

Incremental Updates

If the graph is subject to intensive edge insertion and deletion, landmarks that have been computed originally become outdated and the approximation performance deteriorates. Therefore, landmarks have to be maintained up to date. Although this can be achieved by means of daily or periodical full recomputation, such a solution is computationally expensive. Moreover, for certain applications, such as the above-mentioned social search, it can be particularly important to maintain landmarks up to date at all times. Indeed, if the social search feature is relied upon by new users to establish their first list of contacts, it is important that adding a new contact would be immediately reflected in the consequent search orderings.

Fortunately, when landmarks are maintained in the form of shortest path trees with single pointers (parent links), they can be updated incrementally to accommodate edge insertions or deletions. The procedures for maintaining SPTs under insertions and deletions are known, for example see P. Frigori et al, "Fully dynamic algorithms for maintaining shortest path trees" Journal of Algorithms, Vol 34, November 2, pages 251-281 2000. In the particular case of unweighted graphs with a small diameter, they are fairly straightforward.

Figure 6:
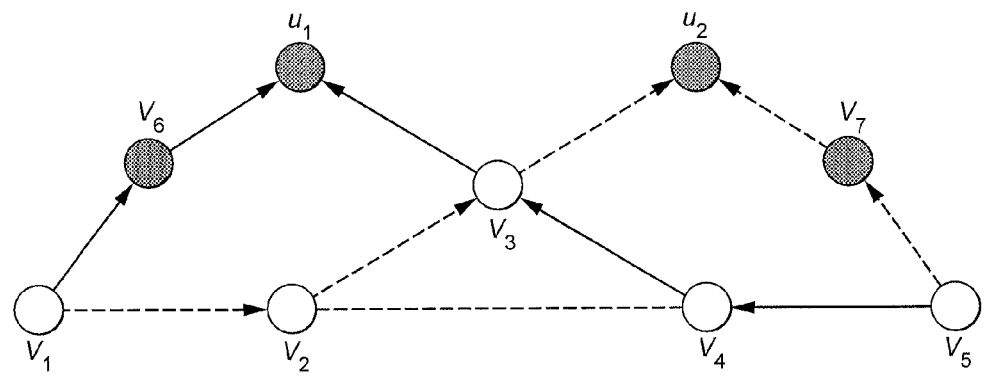
FIG. 6 illustrates a shortest path tree with edge insertion.

As an informal example, consider the SPT presented on FIG. 6. Suppose that an edge $\{u,v_8\}$ has just been inserted into the graph. The SPT update algorithm would proceed as follows. Firstly, note that the newly added edge provides a shorter path from $v_8$ to the landmark than what was previously available. Therefore, the parent pointer of $v_8$ has to be changed to make use of the new edge: $p_u[v_8]:=u$. Now that the path to the landmark from $v_8$ has improved, we have to recursively examine all neighbours of $v_8$ (i.e., $v_6$ and $v_7$) and check, whether switching their parent pointer to $v_8$ would improve their previously known path to the landmark. This is true both for $v_6$ and $v_7$, hence we set $p_u[v_6]:=v_8$, $p_u[v_7]:=v_8$. We repeat this again for all neighbours of $v_6$ and $v_7$. Having found no new path improvements, we complete the update.

The deletion of an edge involves two passes. Consider again FIG. 6 and suppose the edge $\{v_1,v_3\}$ was deleted from the graph. In order to find a new path to the landmark (and a new parent pointer) for $v_3$, we first examine its neighbours ($v_5$ and $v_6$). Unfortunately, both of them relied on $v_3$ for reaching the landmark, hence they provide no immediate fix. We record $v_3$ temporarily in a priority queue, using the best available new path length ($\infty$ so far) as the key. We then recursively descend to process the children of $v_3$ in the SPT. Vertex $v_5$ has no immediate fix and gets recorded in the priority queue with key $\infty$. Vertex $v_6$, however, can be connected to $v_4$, retaining a path to the landmark of length 3. Consequently, there is no need to process children of $v_6$. After reconnecting $v_6$ we must update the keys of its neighbours ($v_3$ and $v_5$) in the priority queue—the new potential path of length 4 is better than the previously recorded $\infty$. This completes the first pass. In the second pass we empty the priority queue, rebuilding the rest of the SPT.

We provide a more formal description of the update procedures in Algorithms 5 and 6.

In theory, a single update may trigger the SPT recomputation for the whole graph (e.g. deleting an edge that was a bridge between the landmark and all the other nodes). In practice, however, such situations are rare and, according to our experiments, the amortized time necessary to process a single update in a real Skype network is in the order of milliseconds.

Networks

The following are examples of real-world social network graphs, representing four different orders of magnitude in terms of network size.

DBLP. The DBLP dataset contains bibliographic information of computer science publications. Every vertex corresponds to an author. Two authors are connected by an edge if they have co-authored at least one publication.

Orkut. Orkut is a large social networking website. It is a graph, where each user corresponds to a vertex and each user-to-user connection is an edge.

Twitter. Twitter is a microblogging site, which allows users to follow each other, thus forming a network.

Skype. Skype is a large social network for peer-to-peer communication. We say that two users are connected by an edge if they are in each other's contact list.

The properties of these datasets are summarized in Table 1. The table shows the number of vertices |V|, number of edges |E|, average distance between vertices d (computed on a sample vertex pairs), approximate diameter Δ, fraction of vertices in the largest connected component |S|/|V|, and average time to perform a BFS traversal over the graph $t_{BFS}$.

TABLE 1

Datasets.

| Dataset | |V| | |E| | d | Δ | |S|/|V| | $t_{BFS}$ |
|---|---|---|---|---|---|---|
| DBLP | 770K | 2.6M | 6.3 | 25 | 85% | 345 ms |
| Orkut | 3.1M | 117M | 5.7 | 10 | 100% | 8 sec |
| Twitter | 41.7M | 1.2B | 4.2 | 25 | 100% | 9 min |
| Skype | 454M | 3.1B | 6.7 | 60 | 85% | 20 min |

Comparative statements made herein concerning accuracy are stored as experiments using a random sample of SV vertex pair from each graph of the above datasets, and a parameter.

Approximation error is computed as (I'-I)/I, where I' is the approximation and I is the actual distance.

Suitable hardware is a server with 32× Quad-core AMD Opteron 64 bit 2.2 GHz processors, 256 G of RAM, accessing IBM DS 3400 FC SAN disk array, running Red Hat Enterprise Linux 5 operating system.

Figure 8:
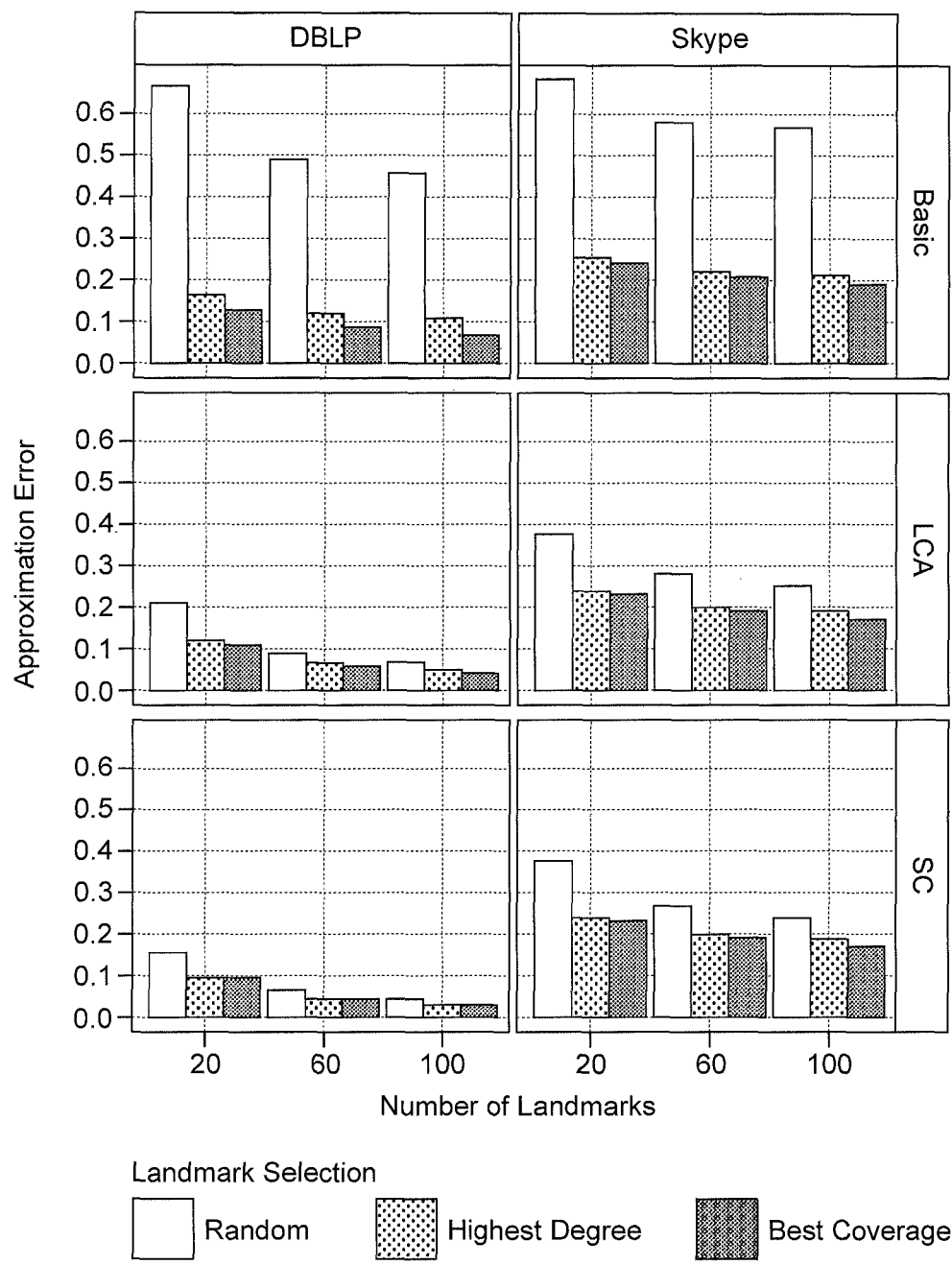
FIG. 8 is a table of experimental results.

Experiments carried out using the above data sets and hardware show improved accuracy with Landmark-LCA, SC and BFS as compared with Landmark-Basic—see FIG. 8.

The algorithms are being presented for the case of an undirected unweighted graph. The techniques can be generalised to weighted graphs by replacing the BFS in the SPT pre-computation phase and in the landmark-BFS algorithm with a Dijkstra traversal. The generalisation to directed graphs requires computing two shortest path trees for each landmark—the first one holding distances to the landmark, and the second one with distances from the landmark. The algorithms then need to be updated slightly to use both trees appropriately (for examples lines 4 and 5 of algorithm 3 will refer to two different trees rather than one).

Being a distance approximation scheme a landmark based algorithm can be used as a heuristic in a unidirectional or bidirectional A* search, as described for example in a paper by Goldberg et al published in 16th ACM—SIAM Symposium of Discrete Algorithms pages 156-165, 2005. In particular, this ability to efficiently estimate exact shortest paths allows us to take larger samples for best coverage landmark selection. Note that due to the incremental update capabilities of the above approach, the result is a fast fully dynamic exact shortest path algorithm.

In the approach described above, all landmarks are selected ex ante and the selection of landmarks is never revised. A further improvement can be obtained by using information collected during the processing of queries in order to add or remove landmarks. Each time a query is answered using the landmark-LCA algorithm, we can identify which landmarks are used and which specify vertices are used as LCAs. Based on the frequency of use of LCA's certain vertices can be promoted to become landmarks, or landmarks that are infrequently used can be dropped.

While this invention has been particularly shown and described with references to example embodiments thereof, it will be understood by those skilled in the art that various changes in form and details may be made therein without departing from the scope of the invention encompassed by the appended claims.

The invention claimed is:

1. A method of processing a search query to provide a search result, the method comprising:
   receiving at a computer device a search query in the form of a digital message, the query identifying a source node and a target node; and
   executing at the computer device an application for generating a search result, the application performing the following steps:
   accessing a data structure holding a plurality of landmark nodes, each landmark having stored therewith a shortest path tree in the form of a set of parent links wherein each parent link identifies an adjacent vertex node;
   for each landmark identifying the location of the source node and the target node in the shortest path trees to the landmark node;
   for each landmark node using the identified locations of the target node and source node to generate a measure of distance between the source node and the target node, wherein the measure of distance is generated by:
      identifying a common ancestor node in the shortest path trees from the source node and the target node to the landmark node;
      identifying all pairs of nodes in the paths between the source node and a second path between the common ancestor node and the target node;
      locating any of said pairs which are edges;
      identifying the edge of the shortest distance; and
      using the edge to determine measure of distance between the source node and the target node;
   determining the landmark with the shortest distance; and
   providing a search result related to the shortest path tree of that landmark.

2. A method according to claim 1 wherein the providing a search result comprises displaying the search result to a user.

3. A method according to claim 1 wherein the providing a search result comprises providing the search result to a search function which generates a comparison between a plurality of search results to provide a set of outputs in ranked order.

4. A method according to claim 1 wherein the search result comprises a list of node identifiers in the shortest path tree of the landmark with the shortest distance.

5. A method according to claim 1 wherein the search result comprises the number of nodes in the shortest path tree of the landmark for the shortest distance.

6. A method of processing a search query to provide a search result, the method comprising:
   receiving at a computer device a search query in the form of a digital message, the query identifying a source node and a target node; and
   executing at the computer device an application for generating a search result, the application performing the following steps:
   accessing a data structure holding a plurality of landmark nodes, each landmark having stored therewith a shortest path tree in the form of a set of parent links wherein each parent link identifies an adjacent vertex node;
   for each landmark identifying the location of the source node and the target node in the shortest path trees to the landmark node;
   for each landmark node using the identified locations of the target node and source node to generate a measure of distance between the source node and the target node, wherein the measure of distance is generated by:
      for each landmark recording nodes in common between the shortest path trees from the source node and the target node to the landmark node;
      executing a graph traversal from the source node, traversing only commonly recorded nodes, to update shortest path from the source node to the target node; and
      using the updated shortest path to determine the measure of distance;

determining the landmark with the shortest distance; and
providing a search result related to the shortest path tree of that landmark.

7. A method according to claim 6 wherein the measure of distance is generated using updated shortest path trees.

8. A method according to claim 6 wherein the providing a search result comprises displaying the search result to a user.

9. A method according to claim 6 wherein the providing a search result comprises providing the search result to a search function which generates a comparison between a plurality of search results to provide a set of outputs in ranked order.

10. A method according to claim 6 wherein the search result comprises a list of node identifiers in the shortest path tree of the landmark with the shortest distance.

11. A method according to claim 6 wherein the search result comprises the number of nodes in the shortest path tree of the landmark for the shortest distance.

12. One or more computer-readable storage memories embodying computer readable instructions which, when executed, implement a method of processing a search query to provide a search result, the method comprising:
receiving at a computer device a search query in the form of a digital message, the query identifying a source node and a target node; and
executing at the computer device an application for generating a search result, the application performing the following steps:
accessing a data structure holding a plurality of landmark nodes, each landmark having stored therewith a shortest path tree in the form of a set of parent links wherein each parent link identifies an adjacent vertex node;
for each landmark identifying the location of the source node and the target node in the shortest path trees to the landmark node;
for each landmark node using the identified locations of the target node and source node to generate a measure of distance between the source node and the target node, wherein the measure of distance is generated by:
identifying a common ancestor node in the shortest path trees from the source node and the target node to the landmark node;
identifying all pairs of nodes in the paths between the source node and a second path between the common ancestor node and the target node;
locating any of said pairs which are edges;
identifying the edge of the shortest distance; and
using the edge to determine measure of distance between the source node and the target node;
determining the landmark with the shortest distance; and
providing a search result related to the shortest path tree of that landmark.

13. The one or more computer-readable storage memories according to claim 12 wherein the providing a search result comprises displaying the search result to a user.

14. The one or more computer-readable storage memories according to claim 12 wherein the providing a search result comprises providing the search result to a search function which generates a comparison between a plurality of search results to provide a set of outputs in ranked order.

15. The one or more computer-readable storage memories according to claim 12 wherein the search result comprises a list of node identifiers in the shortest path tree of the landmark with the shortest distance.

16. The one or more computer-readable storage memories according to claim 12 wherein the search result comprises the number of nodes in the shortest path tree of the landmark for the shortest distance.

17. A computing device comprising:
one or more processors;
one or more computer-readable storage memories embodying computer readable instructions which, when executed by the one or more processors, implement a method of processing a search query to provide a search result, the method comprising:
receiving at a computer device a search query in the form of a digital message, the query identifying a source node and a target node; and
executing at the computer device an application for generating a search result, the application performing the following steps:
accessing a data structure holding a plurality of landmark nodes, each landmark having stored therewith a shortest path tree in the form of a set of parent links wherein each parent link identifies an adjacent vertex node;
for each landmark identifying the location of the source node and the target node in the shortest path trees to the landmark node;
for each landmark node using the identified locations of the target node and source node to generate a measure of distance between the source node and the target node, wherein the measure of distance is generated by:
identifying a common ancestor node in the shortest path trees from the source node and the target node to the landmark node;
identifying all pairs of nodes in the paths between the source node and a second path between the common ancestor node and the target node;
locating any of said pairs which are edges;
identifying the edge of the shortest distance; and
using the edge to determine measure of distance between the source node and the target node;
determining the landmark with the shortest distance; and
providing a search result related to the shortest path tree of that landmark.

18. The computing device according to claim 17 wherein the providing a search result comprises displaying the search result to a user.

19. The computing device according to claim 17 wherein the providing a search result comprises providing the search result to a search function which generates a comparison between a plurality of search results to provide a set of outputs in ranked order.

20. The computing device according to claim 17 wherein the search result comprises a list of node identifiers in the shortest path tree of the landmark with the shortest distance.

21. The computing device according to claim 17 wherein the search result comprises the number of nodes in the shortest path tree of the landmark for the shortest distance.

22. One or more computer-readable storage memories embodying computer readable instructions which, when executed, implement a method of processing a search query to provide a search result, the method comprising:
receiving at a computer device a search query in the form of a digital message, the query identifying a source node and a target node; and
executing at the computer device an application for generating a search result, the application performing the following steps:
accessing a data structure holding a plurality of landmark nodes, each landmark having stored therewith a shortest path tree in the form of a set of parent links wherein each parent link identifies an adjacent vertex node;

for each landmark identifying the location of the source node and the target node in the shortest path trees to the landmark node;

for each landmark node using the identified locations of the target node and source node to generate a measure of distance between the source node and the target node, wherein the measure of distance is generated by:

for each landmark recording nodes in common between the shortest path trees from the source node and the target node to the landmark node;

executing a graph traversal from the source node, traversing only commonly recorded nodes, to update shortest path from the source node to the target node; and using the updated shortest path to determine the measure of distance;

determining the landmark with the shortest distance; and providing a search result related to the shortest path tree of that landmark.

23. The one or more computer-readable storage memories according to claim 22 wherein the measure of distance is generated using updated shortest path trees.

24. The one or more computer-readable storage memories according to claim 22 wherein the providing a search result comprises displaying the search result to a user.

25. The one or more computer-readable storage memories according to claim 22 wherein the providing a search result comprises providing the search result to a search function which generates a comparison between a plurality of search results to provide a set of outputs in ranked order.

26. The one or more computer-readable storage memories according to claim 22 wherein the search result comprises a list of node identifiers in the shortest path tree of the landmark with the shortest distance.

27. The one or more computer-readable storage memories according to claim 22 wherein the search result comprises the number of nodes in the shortest path tree of the landmark for the shortest distance.

28. A computing device comprising:

one or more processors;

one or more computer-readable storage memories embodying computer readable instructions which, when executed by the one or more processors, implement a method of processing a search query to provide a search result, the method comprising:

receiving at a computer device a search query in the form of a digital message, the query identifying a source node and a target node; and executing at the computer device an application for generating a search result, the application performing the following steps:

accessing a data structure holding a plurality of landmark nodes, each landmark having stored therewith a shortest path tree in the form of a set of parent links wherein each parent link identifies an adjacent vertex node;

for each landmark identifying the location of the source node and the target node in the shortest path trees to the landmark node;

for each landmark node using the identified locations of the target node and source node to generate a measure of distance between the source node and the target node, wherein the measure of distance is generated by:

for each landmark recording nodes in common between the shortest path trees from the source node and the target node to the landmark node;

executing a graph traversal from the source node, traversing only commonly recorded nodes, to update shortest path from the source node to the target node; and using the updated shortest path to determine the measure of distance;

determining the landmark with the shortest distance; and providing a search result related to the shortest path tree of that landmark.

29. The computing device according to claim 28 wherein the measure of distance is generated using updated shortest path trees.

30. The computing device according to claim 28 wherein the providing a search result comprises displaying the search result to a user.

31. The computing device according to claim 28 wherein the providing a search result comprises providing the search result to a search function which generates a comparison between a plurality of search results to provide a set of outputs in ranked order.

32. The computing device according to claim 28 wherein the search result comprises a list of node identifiers in the shortest path tree of the landmark with the shortest distance.

33. The computing device according to claim 28 wherein the search result comprises the number of nodes in the shortest path tree of the landmark for the shortest distance.

* * * * *